United States Patent
Zhao (10) Patent No.: US 12,543,911 B2
(45) Date of Patent: Feb. 10, 2026

(54) SEWAGE STORAGE TANK AND CLEANING ROBOT

(71) Applicant: SHENZHEN SILVER STAR INTELLIGENT GROUP CO., LTD, Shenzhen (CN)

(72) Inventor: Jiancong Zhao, Shenzhen (CN)

(73) Assignee: SHENZHEN SILVER STAR INTELLIGENT GROUP CO., LTD, Shenzhen (CN)

( * ) Notice: Subject to any disclaimer, the term of this patent is extended or adjusted under 35 U.S.C. 154(b) by 338 days.

(21) Appl. No.: 17/939,032

(22) Filed: Sep. 7, 2022

(65) Prior Publication Data

US 2023/0165424 A1  Jun. 1, 2023

(30) Foreign Application Priority Data

Nov. 30, 2021  (CN) .......................... 202111449180.8

(51) Int. Cl.
*A47L 11/40* (2006.01)

(52) U.S. Cl.
CPC ................................ *A47L 11/4016* (2013.01)

(58) Field of Classification Search
CPC .................................................. A47L 11/4016
USPC .................................................. 15/320, 347
See application file for complete search history.

(56) References Cited

U.S. PATENT DOCUMENTS

2011/0079248 A1* 4/2011 Huffman ............ A47L 11/4011
                                                    134/21
2014/0259511 A1   9/2014 Ziegler et al.
2015/0313433 A1* 11/2015 Ruffo ................... A47L 11/283
                                                    15/320
2018/0168416 A1* 6/2018 Miller .................. A47L 7/0038

FOREIGN PATENT DOCUMENTS

| CN | 209346902 U | 9/2019 |
|---|---|---|
| CN | 209574574 U | 11/2019 |
| CN | 112022018 A | 12/2020 |
| CN | 112842177 A | 5/2021 |
| CN | 112932353 A | 6/2021 |
| CN | 214712399 U | 11/2021 |
| CN | 216535197 U | 5/2022 |

OTHER PUBLICATIONS

CN First Examination Opinion Notice for CN application 202111449180.8, Prepared by the CN Patent Office, Dated Feb. 11, 2025, 7 pages.

* cited by examiner

*Primary Examiner* — Tom Rodgers
(74) *Attorney, Agent, or Firm* — Brooks Kushman P.C.

(57) ABSTRACT

A sewage storage tank, including: a tank body and a barrier. The tank body defines therein a suction port and an intake port. The suction port is configured to communicate with a suction fan arranged outside the sewage storage tank, to enable the suction fan to suction air from the tank body via the suction port and to generate a negative pressure at the intake port, such that sewage outside the tank body is suctioned into the tank body via the intake port under the negative pressure. The barrier structure is arranged inside the tank body and located in a flow path between the intake port and the suction port, so as to block the sewage having entered the intake port from moving towards the suction port. A cleaning robot is further provided. The cleaning robot includes the sewage storage tank.

20 Claims, 8 Drawing Sheets

SEWAGE STORAGE TANK AND CLEANING ROBOT

CROSS-REFERENCE TO RELATED APPLICATIONS

Pursuant to 35 U.S.C. § 119 and the Paris Convention, this application claims the benefit of Chinese Patent Application No. 202111449180.8 filed Nov. 30, 2021, the contents of which are incorporated herein by reference.

BACKGROUND

Technical Field

The present application relates to the technical field of the cleaning robot, and more particularly to a sewage storage tank and a cleaning robot.

Description of Related Art

The statements herein merely provide background information related to the present application and do not necessarily constitute prior art.

As one of intelligent household cleaning apparatus, cleaning robot is able to automatically washing the ground in a room, which reduces the labor intensity of human beings and brings in great convenience to the modern life. The cleaning robot usually works in a water environment for a long period, and the recovered sewage is drawn into and stored in a sewage storage tank under a suction force of the suction fan. However, the sewage accommodated in the sewage storage tank may further pass through the suction port and enter the suction fan under the suction force, which may easily cause the damage of the suction fan.

SUMMARY

It is one of objectives of the present application to provide a sewage storage tank that is able to prevent the sewage from flowing into the suction port.

In order to solve the above technical problems, the following technical solutions are adopted by the present application:

According to a first aspect of the present application, a sewage storage tank is provided. The sewage storage tank comprises a tank body and a barrier.

The tank body defines therein a suction port and an intake port. The suction port is configured to communicate with a suction fan arranged outside the sewage storage tank, to enable the suction fan to suction air from the tank body via the suction port and to generate a negative pressure at the intake port, such that sewage outside the tank body is suctioned into the tank body via the intake port under the negative pressure.

The barrier structure is arranged inside the tank body and located in a flow path between the intake port and the suction port, so as to block the sewage having entered the intake port from moving towards the suction port.

In an embodiment of the present application, the sewage storage tank further comprises a cover plate. The cover plate is laterally mounted in the tank body and located above the suction port and the intake port. The barrier structure comprises a first barrier portion. The first barrier portion is arranged at a bottom surface of the cover plate and extends in a direction away from the cover plate so as to block the sewage having entered the intake port from moving towards the suction port.

In an embodiment of the present application, the first barrier portion comprises a first barrier rib, and a height of a bottom edge of the first barrier rib is equivalent to a height of the intake port.

In an embodiment of the present application, the sewage storage tank further comprises a tank cover. The tank cover is configured to cover the tank body to form an enclosed accommodation chamber with the tank body and to allow the cover plate to be placed inside the accommodation chamber. A bottom surface of the tank cover is protrudingly provided with a second barrier portion, and the second barrier portion is arranged close to an edge of the cover plate so as to block the sewage having entered the intake port from flowing above the cover plate.

In an embodiment of the present application, the second barrier portion comprises a second barrier rib. The second barrier rib extends downwards from the bottom surface of the tank cover. A horizontal distance-between a surface of the second barrier rib and the edge of the cover plate is greater than or equal to 0.5 mm, and smaller than or equal to 5 mm.

In an embodiment of the present application, a gap is arranged between the tank cover and the cover plate. The bottom surface of the tank cover is further provided with a third barrier portion. The third barrier portion is arranged within the gap and configured for blocking the sewage having entered the gap.

In an embodiment of the present application, the third barrier portion comprises a third barrier rib. The third barrier rib extends from the bottom surface of the tank cover downwards. At least one end of the third barrier rib extends over the edge of the cover plate in order to guide the sewage to fall downwards to a bottom of the tank body.

In an embodiment of the present application, a top surface of the cover plate is further provided with a fourth barrier portion. The fourth barrier portion is arranged within the gap. The fourth barrier portion is arranged at a side of the third barrier portion adjacent to the suction port, so as to prevent the sewage having fallen from the third barrier portion to the cover plate from moving towards the suction port.

In an embodiment of the present application, the fourth barrier portion comprises a fourth barrier rib. The fourth barrier rib is convex from the top surface of the cover plate.

In an embodiment of the present application, a boss is arranged within the sewage storage tank, and the boss is convex from a bottom wall of the tank body. The cover plate has a sealed position and an unsealed position. One end of the cover plate is in rotatable connection with the boss, so as to rotatably move with respect to the boss to the sealed position and simultaneously seal both the suction port and the intake port, or to rotatably move with respect to the boss to the unsealed position and simultaneously unseal both the suction port and the intake port.

In an embodiment of the present application, the sewage storage tank further comprises a driver. The driver is mounted inside the tank body and configured to drive the cover plate to move from the sealed position to the unsealed position.

According to a second aspect of the present application, a cleaning robot is provided. The cleaning robot comprises: the above-described sewage storage tank, a cleaning roller, and a suction fan. The suction fan is mounted at a position corresponding to the suction port of the sewage storage tank.

The cleaning roller is mounted beneath the sewage storage tank and close to the intake port.

During the working process of the sewage storage tank according to embodiments of the present application, the sewage having entered the tank body through the intake port tends to further move towards the suction port under the action of the negative pressure. In these embodiments, by arranging the barrier structure inside the tank body and in the path between the intake port and the suction port, the sewage having entered through the intake port is prevented from moving towards the suction port, which effective reduces the risk of blocking and damaging the suction port by the sewage. In this way, the sewage storage tank according to embodiments of the present application is able to effectively prevent the sewage from blocking the suction port and ensure the safety and stability of the working of the cleaning robot.

It is to be understood that the foregoing general description and the following detailed description are exemplary only and do not constitute limitation of the application.

BRIEF DESCRIPTION OF THE DRAWINGS

The above objectives and other objectives, features, and beneficial effects of the present application will become more apparent from the detailed description of the exemplary embodiments with reference to the accompanying drawings.

In the drawings, the following reference numerals are adopted:
- 100. sewage storage tank;
- 1. Tank body; 11. Suction port; 12. Intake port; 3. Boss; 14. Suction channel; 15. Intake channel;
- 2. Cover plate; 21. First barrier portion; 211. First barrier rib; 22. Fourth barrier portion; 221. Fourth barrier rib;
- 3. Tank cover; 31. Second barrier portion; 311. Second barrier rib; and 32. Third barrier portion; 321. Third barrier rib;
- 4. Barrier structure;
- 5. Accommodation chamber;
- 6. Driver;
- 1000. Cleaning robot;
- 200. Suction fan; and
- 300. Cleaning roller.

DETAILED DESCRIPTION OF THE EMBODIMENTS

While this application may readily be embodied in different forms of embodiments, only some of the specific embodiments are shown in the drawings and will be described in detail in this specification. It is to be understood that this specification is to be regarded as an exemplary illustration of the principles of the application, and is not intended to limit the application to that described herein.

Thus, a feature indicated in this specification will be used to describe one of the features of an embodiment of the application without implying that every embodiment of the application must have the stated feature. Furthermore, it should be noted that this specification describes a number of features. Although certain features may be combined together to illustrate possible system designs, these features may also be used in other combinations not explicitly stated. Thus, unless otherwise stated, the combinations described are not intended to be limiting.

In the embodiments shown in the drawings, directional indications (such as up, down, left, right, front, and rear) are used to explain that the structure and movement of various elements of the present application are not absolute but relative. These descriptions are appropriate when the elements are in the positions shown in the drawings. If the descriptions of the positions of these elements change, the indications of these directions change accordingly.

Exemplary embodiments will now be described more fully with reference to the accompanying drawings. Exemplary embodiments, however, can be embodied in a variety of forms and should not be construed as limited to the examples described herein; rather, these exemplary embodiments are provided so that this description will be thorough and complete, and the concepts of the exemplary embodiments will be fully conveyed to those skilled in the art. The drawings are merely schematic illustrations of the present application and are not necessarily drawn to scale. The same reference numerals in the drawings denote the same or similar parts, and thus their repeated descriptions will be omitted.

Preferred embodiments of the present application will be further described in details hereinbelow with reference to the accompanying drawings of the present specification.

The present application discloses a cleaning robot, and a sewage storage tank 100 configured to be arranged in the cleaning robot. The cleaning robot includes: a robot body, a sewage storage tank, a suction fan, a cleaning roller, a roller drive assembly, a liquid storage tank, a liquid supply mechanism, and a driving wheel assembly. The robot body is configured to support the above-mentioned structures. The sewage storage tank is configured to accommodate sewage and has a suction port and an intake port. The suction port communicates with the suction fan. The suction fan is configured to draw the air out of the sewage storage tank through the suction port. The cleaning roller is arranged beneath the sewage storage tank. The roller drive assembly is configured to drive the cleaning roller to rotate, such that the cleaning roller cleans the ground surface and the sewage on the ground surface is drawn into the sewage storage tank through the intake port of the sewage storage tank under the action of a negative pressure. The liquid storage tank is configured to store a cleaning liquid, and the cleaning liquid is then applied to the cleaning roller through the liquid supply mechanism, so as to wet the cleaning roller and enable the cleaning roller to wash the ground surface. The driving wheel assembly is mounted at a bottom of the robot body and configured to drive the cleaning robot to move forward, backward, or turning around. It should be understood that "sewage" in embodiments of the present application includes, but is not limited to, wastewater produced during the cleaning process of the cleaning robot, debris, dusts, mud, and hair on the ground surface.

Specific details of the sewage storage tank will be described hereinbelow in conjunction with the following embodiments.

Figure 1:
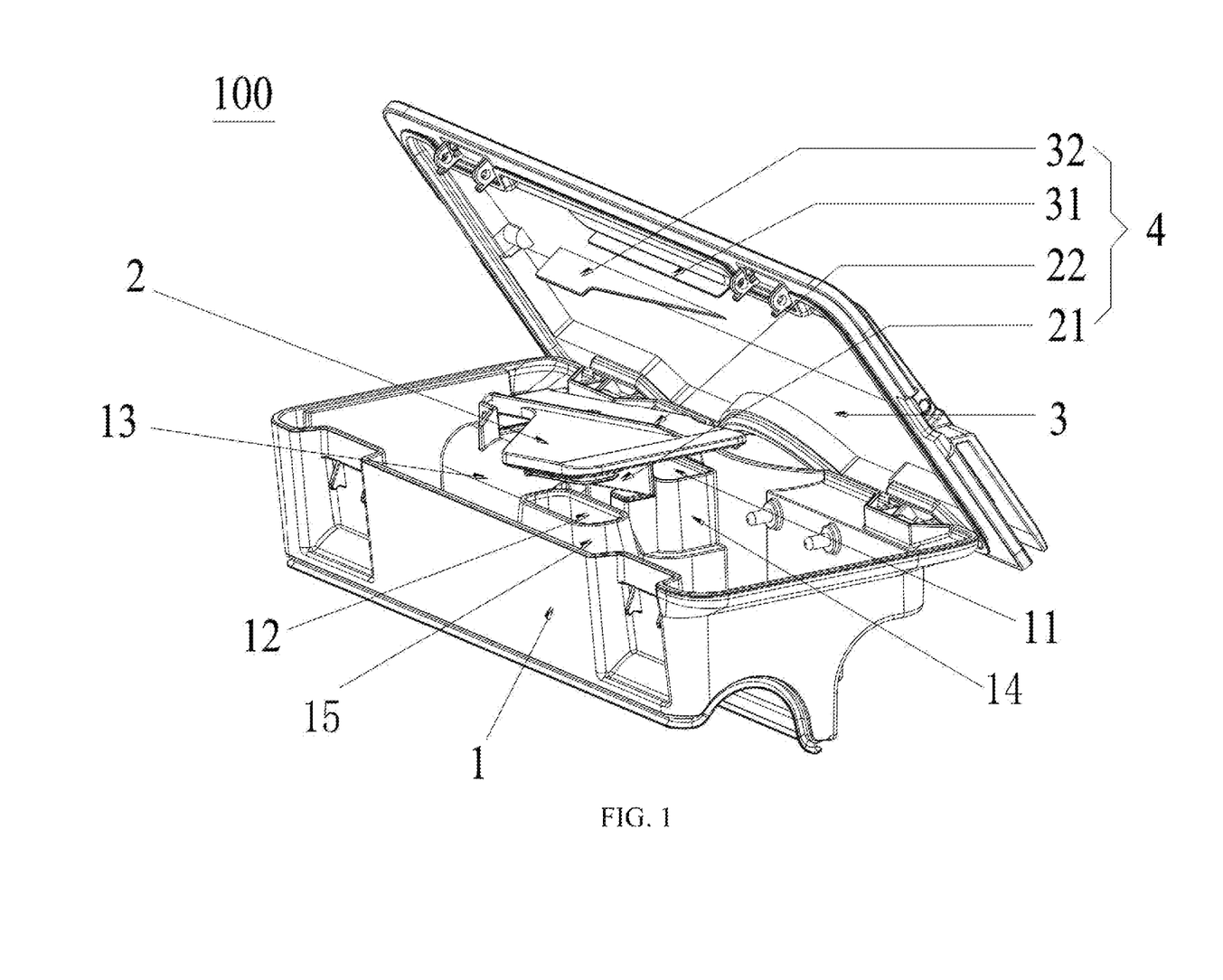
FIG. 1 is a structural schematic view of a sewage storage tank according to an embodiment of the present application.

Referring to FIG. 1, which is a structural schematic view of a sewage storage tank 100, in an embodiment, the sewage storage tank 100 comprises a tank body 1 and a barrier. The tank body defines therein a suction port 11 and an intake port 12. The suction port 11 is configured to communicate with a suction fan arranged outside the sewage storage tank, to enable the suction fan to suction air from the tank body via the suction port 11 and to generate a negative pressure at the intake port 12, such that sewage outside the tank body 1 is suctioned into the tank body 1 via the intake port 12 under the negative pressure. The barrier structure 4 is arranged inside the tank body 1 and located in a flow path between the intake port 12 and the suction port 11, so as to block the sewage having entered the intake port 12 from moving towards the suction port 11, thereby further preventing the sewage from flowing into the suction fan and causing damage to the suction fan.

In some embodiments, the tank body 1 is configured to accommodate sewage, which is usually wastewater formed by a mixture of water and solid dirt. The suction port 11 and the intake port 12 are both higher than the bottom wall of the tank body 1. Schematically, a suction channel 14 is formed by extending upward from the bottom wall of the tank body 1, a top opening of the suction channel 14 forms the suction port 11, and a bottom of the suction channel 14 communicates with the suction fan. An intake channel 15 is formed by extending upward from the bottom wall of the tank body 1, a top of the intake channel 15 forms the intake port 12, and a bottom of the intake channel 15 is connected with a cleaning roller.

Specifically, a suction part and an intake part are formed inside the tank body 1. The suction part is fixed on the bottom wall of the tank body 1. One end of the suction channel 14 penetrates an end of the suction part away from the bottom wall and forms the suction port 11, and the other end of the suction channel 14 penetrates the bottom wall and forms an opening communicating with the suction fan. The intake part is also fixed on the bottom wall of the tank body. One end of the intake channel 15 penetrates an end of the intake part away from the bottom wall and forms the intake port 12, and the other end of the intake channel 15 penetrates the bottom wall and forms an opening corresponding to the cleaning roller.

A cross section profile of the intake channel 15 extending upward from the bottom wall of the tank body 1 gradually tapers, such that a portion of the intake channel 15 close to the bottom wall of the tank body 1 presents an arrangement of an obtuse angle. Such arrangement enables the air flow to enter the intake channel 15 from outside the tank body 1 more smoothly to a certain degree, thereby reducing the air volume loss caused by excessive diversion of the air flow (that is, too large of a diversion angle), and improving the utilization rate of the wind energy.

When the cleaning roller of the cleaning robot is working, the cleaning roller rotates, and at the same time lifts up the sewage including wastewater and debris. In such condition, the suction fan draws the air, such that air inside the tank body 1 tends to be discharged at the suction port 11 and a negative pressure is therefore formed at the intake port, and the sewage including the wastewater and the debris are easily to be suctioned into the tank body 1 via the intake port 12.

After the sewage enters the tank body 1, a part of the sewage tends to fall to the bottom of the tank body 1, but another part of the sewage tends to move to the suction port 11 under the action of negative pressure, therefore, in the present application, by arranging a barrier in the path between the intake port 12 and the suction port 11, the sewage is prevented from moving towards the suction port 11 and from entering the suction fan, which may otherwise cause damage to the suction fan.

The barrier structure 4 can be arranged in various manners, for example, in some embodiments, the barrier structure 4 is arranged on the bottom of the tank body 1, extending toward the top of the tank body 1; and in other embodiments, the barrier structure 4 is arranged on a side of the tank body 1, and extends horizontally between the intake port 12 and the suction port 11. The barrier structure 4 may be implemented in various manners, for example, the barrier structure 4 may comprise: any one of a first barrier portion 21, a second barrier portion 31, a third barrier portion 32, and a fourth barrier portion 22; or any combination of the first barrier portion 21, the second barrier portion 31, the third barrier portion 32, and the fourth barrier portion 22. The specific structure of the barrier structure 4 can also adopt various forms, for example, in some embodiments, the barrier structure 4 is in a mesh structure to block hair and large particles of sewage. In other embodiments, the barrier structure 4 is a sponge, which is configured to absorb the sewage.

During the working process of the sewage storage tank 100 according to embodiments of the present application, the sewage having entered the tank body 1 through the intake port 12 tends to further move towards the suction port 11 under the action of the negative pressure. In these embodiments, by arranging the barrier structure 4 inside the tank body 1 and in the path between the intake port 12 and the suction port, the sewage having entered through the intake port 12 is prevented from moving towards the suction port 11, which effective reduces the risk of blocking and damaging the suction port 11 by the sewage. In this way, the sewage storage tank 100 according to embodiments of the present application is able to effectively prevent the sewage from blocking the suction port 11 and ensure the safety and stability of the working of the cleaning robot.

Figure 2:
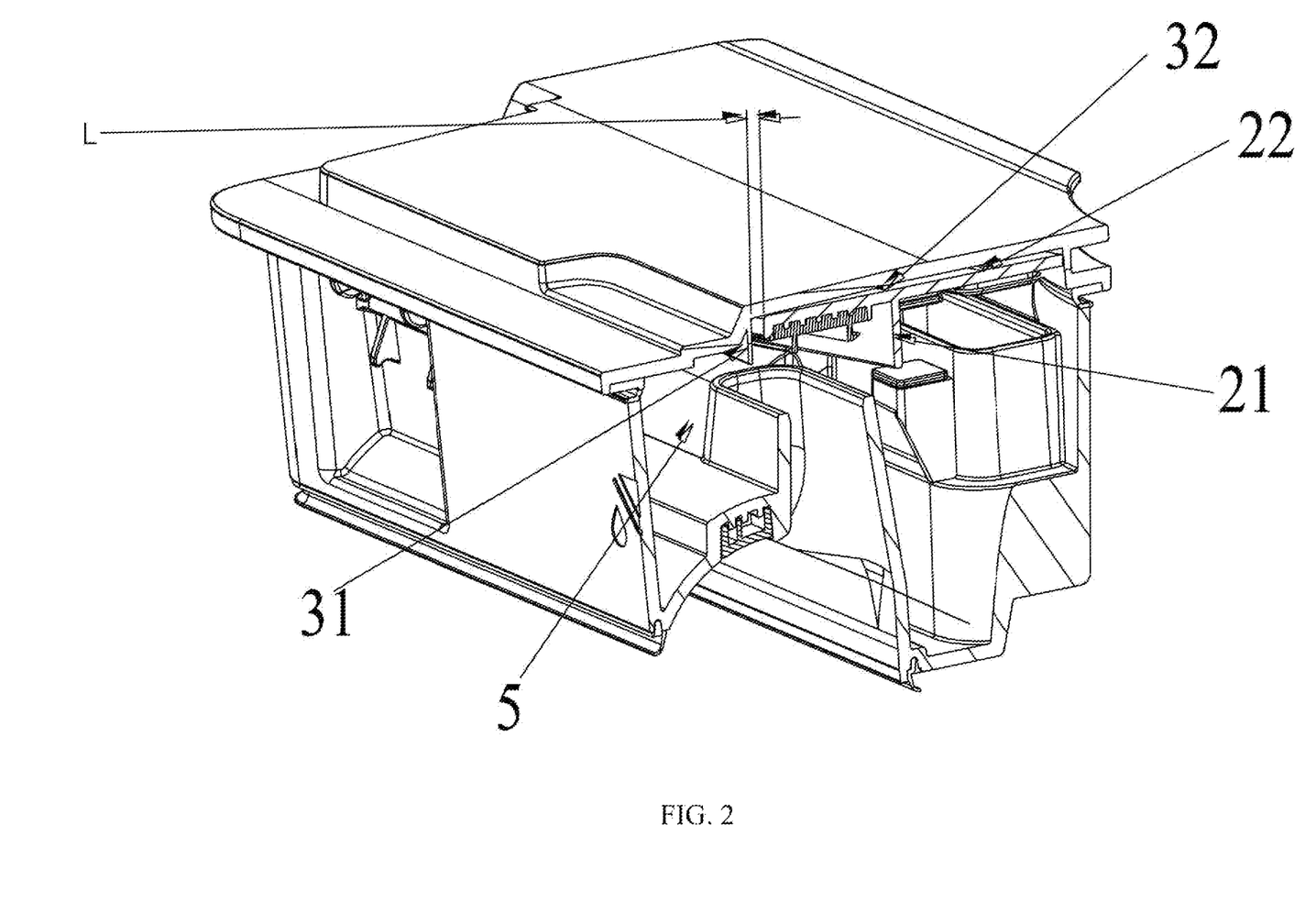
FIG. 2 is a cross-sectional view of the sewage storage tank of FIG. 1, when a tank cover is in a covering state.
Figure 3:
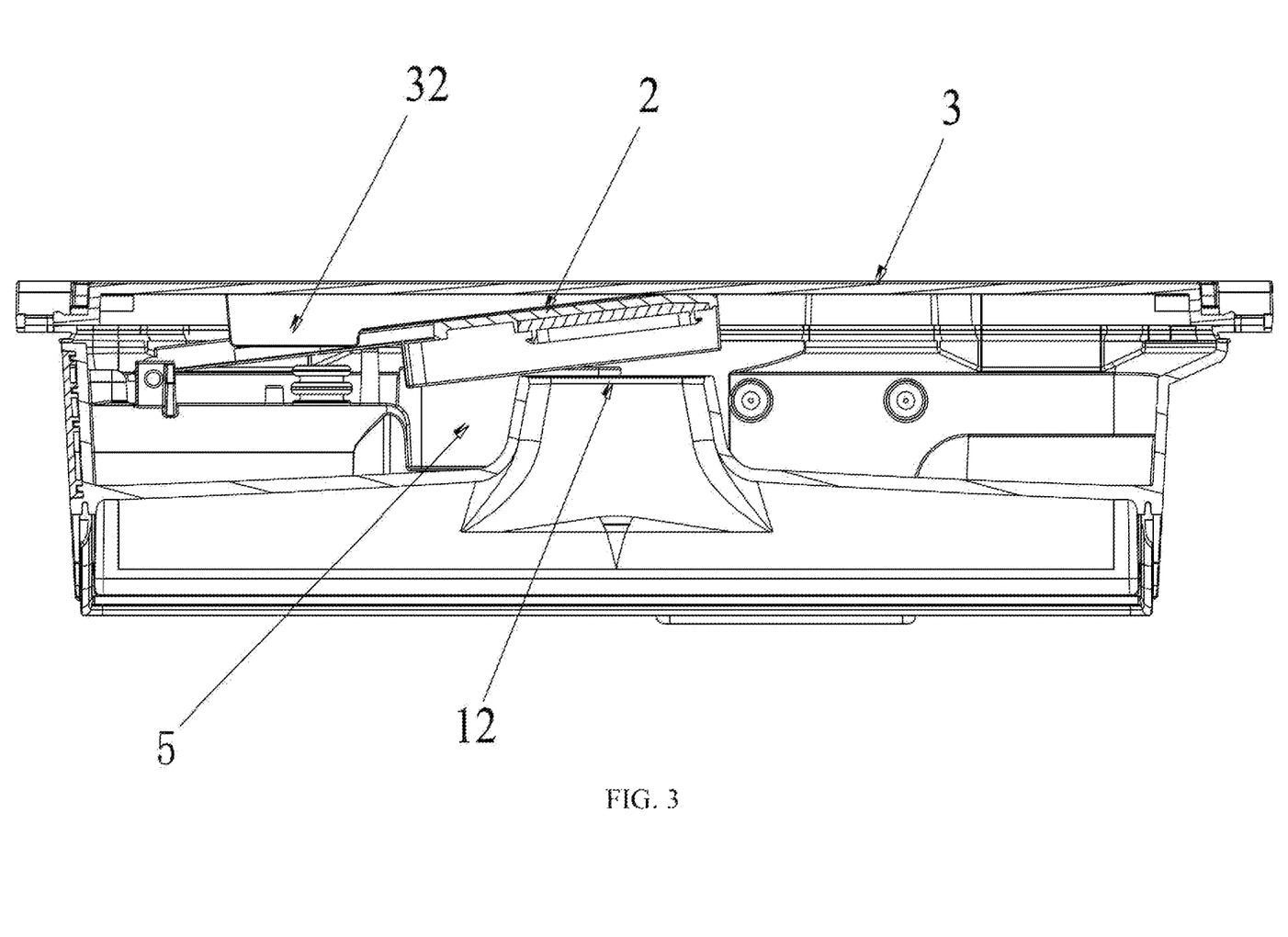
FIG. 3 is a lateral view of the sewage storage tank of FIG. 1, when the tank cover is in a covering state.
Figure 4:
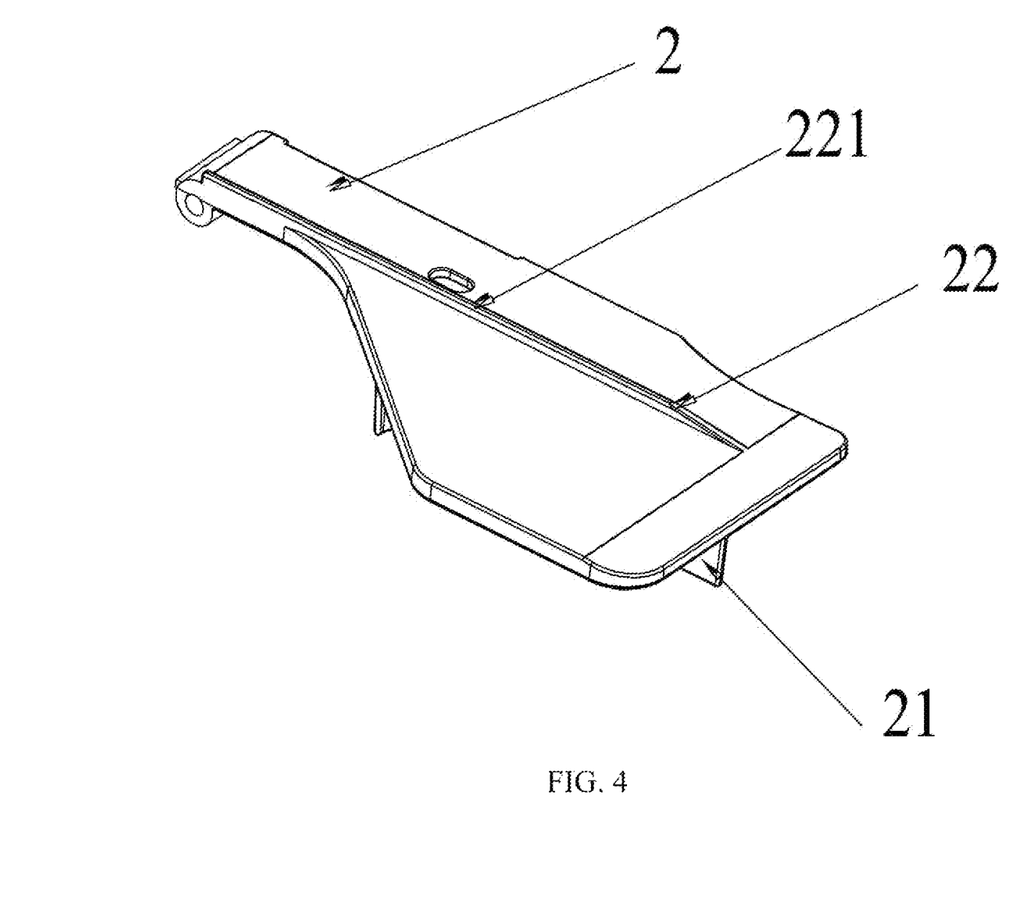
FIG. 4 is a structural schematic view of a cover plate according to an embodiment of the present application.
Figure 5:
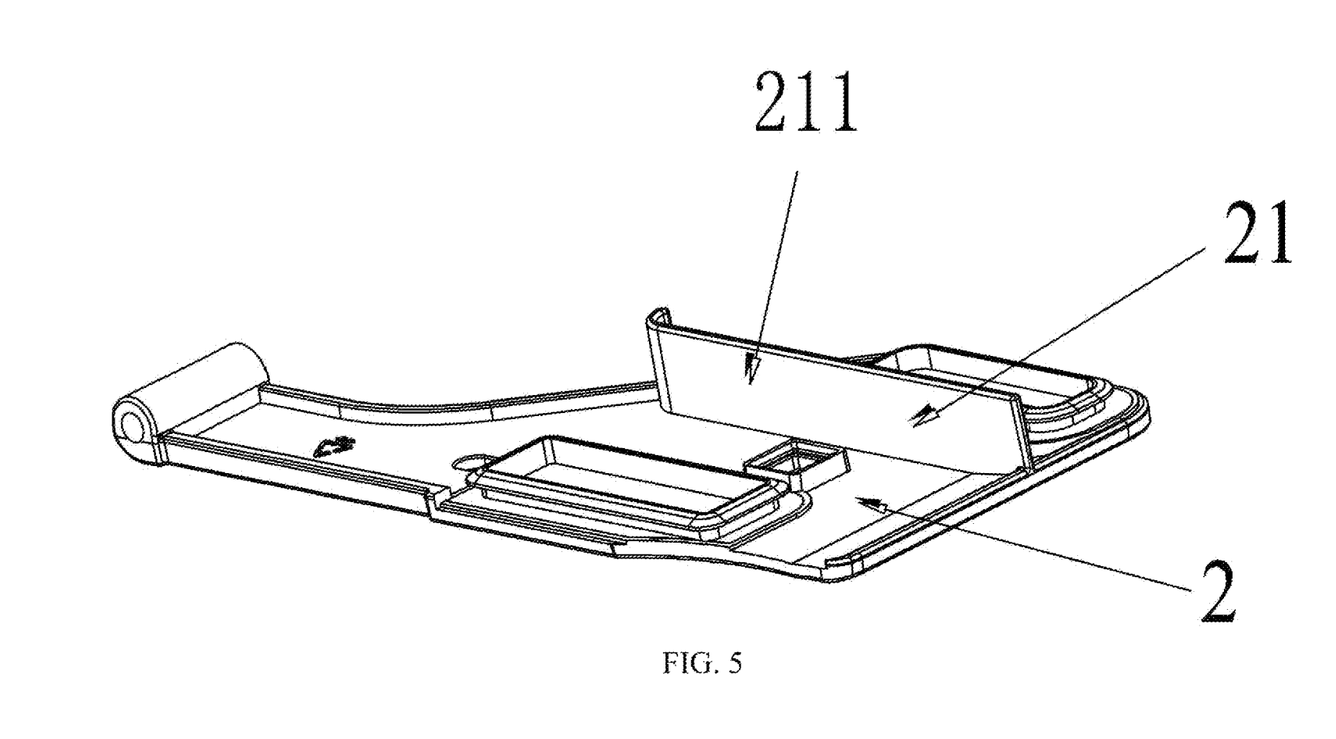
FIG. 5 is a structural schematic view of the cover plate of FIG. 4 from another view angel.

Referring to FIGS. 2-5, FIG. 2 is a cross-sectional view of the sewage storage tank 100 of FIG. 1, when a tank cover 3 is in a covering state. FIG. 3 is a lateral view of the sewage storage tank 100 of FIG. 1, when the tank cover 3 is in a covering state. FIG. 4 is a structural schematic view of a cover plate 2 according to an embodiment of the present application. FIG. 5 is a structural schematic view of the cover plate 2 of FIG. 4 from another view angel. In an embodiment, the sewage storage tank 100 comprises a cover plate 2. The cover plate 2 is laterally mounted in the tank body 1 and located above the suction port 11 and the intake port 12. The barrier structure 4 comprises a first barrier portion 21. The first barrier portion 21 is arranged at a bottom surface of the cover plate 2 and extends in a direction away from the cover plate so as to block the sewage having entered the intake port 12 from moving towards the suction port 11.

In an embodiment, the cover plate 2 integrally presents a flat plate structure and is accommodated in the tank body 1. The cover plate has two stable position states, that is, a sealed position and an unsealed position. The cover plate 2 can move between the sealed position and the unsealed position. The cover plate 2 is configured to seal the suction port 11 and the intake port 12 when the cover plate 2 is located at the sealed position, and to unseal the suction port 11 and the intake port 12 when the cover plate 2 is located at the unsealed position.

Specifically, at the sealed position, the cover plate 2 integrally covers and seals the suction port 11 and the intake port 12. In such condition, the sewage inside the tank body 1 will not overflow out from the tank body 1 via the suction channel 14 and the intake channel 15, thereby avoiding the safety accident caused by the overflow of the sewage. At the unsealed position, the cover plate 1 unseals the suction port 11 and the intake port 12, the suction fan can draw the air out of the tank body 1 to enable the intake port 12 to be at a negative pressure state, which is convenient to suck the sewage from the ground the cleaning roller.

In an embodiment, the cover plate 2 is in rotational connection with the tank body 1. That is, the cover plate 2 can be rotatable between the sealed position and the unsealed position. Specifically, the bottom wall or the side wall of the tank body 1 are partly concave inwards to form a boss 13. One end of the cover plate is in rotational connection with an upper surface of the boss 13, and the other end of the cover plate is pivotable around the above-mentioned one end, so as to seal or unseal the suction port 11 and the intake port 12. It may be understood that in other embodiments of the present application, the cover plate 2 may also constructed to be rotatable around other directions. Preferably, the suction port 11 and the intake port 12 are at the same height, in this way, when the cover plate 2 is at the sealed position, one end of the cover plate 2 is supported at the boss 13, while the other end of the cover plate 2 is supported on both the suction port 11 and the intake port 12.

Figure 7:
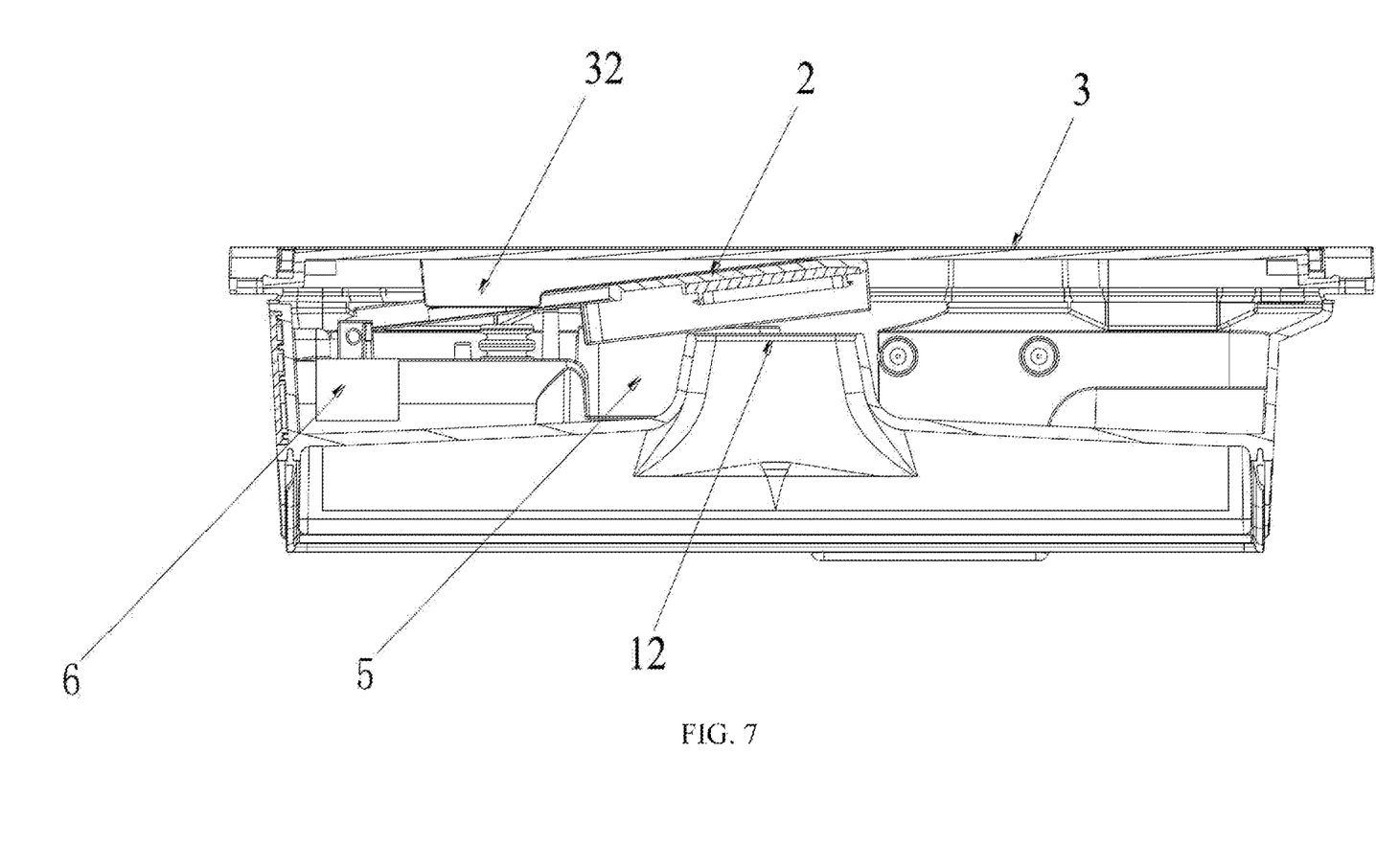
FIG. 7 is a lateral view of the sewage storage tank of FIG. 1, when the tank cover is in a covering state, according to another embodiment of the present application.

In an embodiment, as shown in FIG. 7, the sewage storage tank further comprises a driver 6. The driver 6 is mounted inside the tank body and configured to drive the cover plate to move from the sealed position to the unsealed position. The driver 6 may be a motor driver or a cylinder driver, which is not limited herein. The driver 6 is utilized to realize the automatic driving of the cover plate 2 to adjust the position state of the cover plate 2, which is convenient for the user to use, and is able to accurately control the rotation angle and rotation position of the cover plate 2, thereby ensuring the reliability of the sealing and unsealing of the suction port 11 and the intake port 12.

Furthermore, in order to enhance the sealing performance of the cover plate 2 on the suction port 11 and the intake port 12, one side of the cover plate 2 adjacent to the suction port 11 and the intake port 12 is provided with elastic sealing members (which are not shown in the figures), such as rubber sheets or sealing rings, to seal the connection positions of the cover plate 2 with the suction port 11 and the intake port 12, respectively. It may be understood that the connection manner between the cover plate 2 and the tank body 210 is not limited to the rotational connection in the above embodiment, in other embodiments of the present application, the cover plate 2 may also be connected with the tank body 210 in other manners, for example, by slidable connection, as long as such connection manners can ensure the reciprocate movement of the cover plate 2 between the sealed position and the unsealed position to realize the sealing and unsealing of the intake channel 15 and the suction channel 14.

Schematically, a mounting bracket is arranged inside the tank body 1, the cover plate 2 is pivotally connected at the mounting bracket. By rotating the cover plate 2, the intake port 12 and the suction port 11 can be opened or covered.

A height of the cover plate 2 is higher than both heights of the suction port 11 and the intake port 12, so as to form a ventilation gap between the cover plate 2 and the suction port 11 and a ventilation gap between the cover plate 2 and the intake port 12. The ventilation gap between the cover plate 2 and the suction port 11 enables the air to be fluently drawn out of the tank body 1 and ensures the success formation of the negative pressure in the tank body 1. The ventilation gap between the cover plate 2 and the intake port 12 enables the sewage to flow upwards out of the intake port 12, to continue moving up until being blocked by the cover plate 2, and then to disperse to fall downwards to the tank body 1. Therefore, the cover plate 2 in the present application can facilitate the sewage having entered the tank body 1 through the intake port 12 to fluently falling downwards to the bottom of the tank body 1, thereby reducing the amount of the sewage moving towards the suction port 11.

As shown in FIG. 5, in an embodiment, a first barrier portion is arranged at the cover plate 2, and extends from a lower surface of the cover plate 2 downwards, without occupying the space of the bottom of the tank body. When the sewage is suctioned in via the intake port and blocked by the cover plate 2, a part of the sewage tends to move towards the suction port 11. In such condition, the first barrier portion 21 is able to block the sewage, to prevent the sewage from being directly enter the suction port 11. Moreover, when the sewage meets the first barrier portion 21, solid dirt in the sewage may be accumulated at a barrier rib and agglomerated to form a solid-liquid mixture in the form of large particles, which then fall downward to the tank body 1 under the gravity.

The first barrier portion 21 may comprises a barrier mesh and a material having absorption ability. In an embodiment, the first barrier portion 21 comprises a first barrier rib 211, the first barrier rib 211 is in the shape of a sheet. The sheet-like barrier rib has relatively large surface area, which is able to block and adhere the sewage. The first barrier rib 211 extends from the lower surface of the cover plate 2 downwards, if the first barrier rib 211 is too long, the negative pressure at the intake port will be affected; and if the first barrier rib 211 is too short, the sewage cannot be effectively blocked. Therefore, in this embodiment, a height of a bottom edge of the first barrier rib 211 is equivalent to a height of the intake port. In this way, not only can the sewage be effectively blocked by the first barrier rib 211, but also the influence on the air circulation within the tank body 1 is reduced, and the sufficient negative pressure at the intake port 12 is ensured.

The first barrier portion and the cover plate 2 can be formed as a whole, or can be in fixed connection by a fastener. The arrangement of the first barrier rib 211 is able to enhance the integral intensity of the cover plate 2.

After the sewage flows upwards out of the intake port 12, another part of the sewage tends to move towards a side away from the suction port 11, which therefore easily results in risk of blocking the suction port 11. Based on this, referring to FIG. 6, which is a structural schematic view of a tank cover 3 according to an embodiment of the present application, in an embodiment, the sewage storage tank 100 further comprises a tank cover 3. The tank cover 3 is configured to cover the tank body 1 to form an enclosed accommodation chamber 5 between the tank body 1 and the tank cover 3 and to allow the cover plate 2 to be placed inside the accommodation chamber 5, with a gap being formed between the tank cover 3 and the cover plate 2. A bottom surface of the tank cover 3 is protrudingly provided with a second barrier portion 31, and the second barrier portion 31 is arranged at a side of the intake port 12 away from the suction port 11 and close to an edge of the plate 2, so as to block the sewage having entered the intake port 12 from flowing above the cover plate 2.

Figure 6:
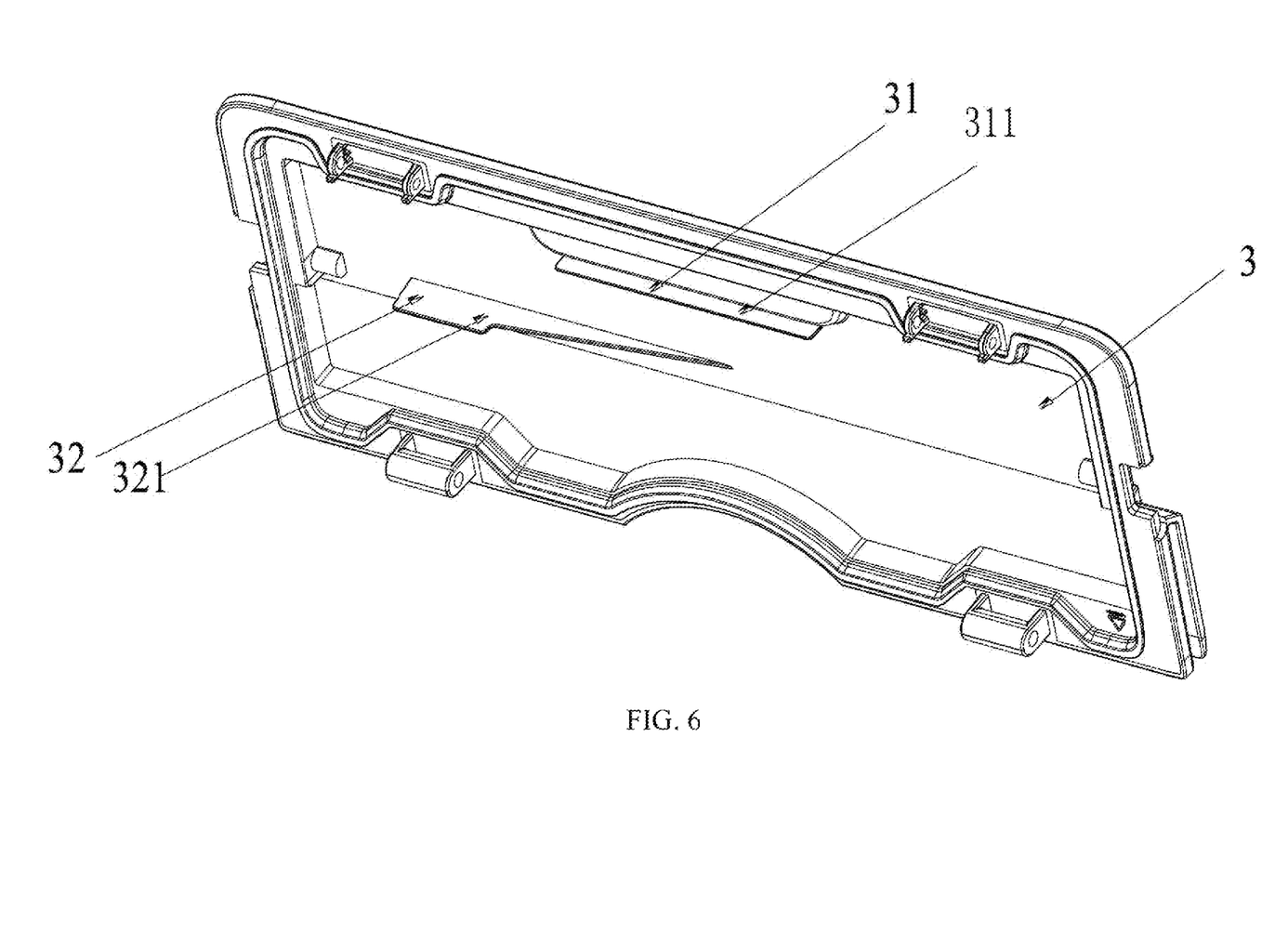
FIG. 6 is a structural schematic view of a tank cover according to an embodiment of the present application.

In this embodiment, by arranging the second barrier portion 31 at a side of the intake port 12 away from the suction port 11 and close to an edge of the plate 2, the sewage flowing towards an opposite direction is blocked and is prevented from transcending above the cover plate 2. A distance between the second barrier portion 31 and the cover plate 2 is required to be as small as possible, so as to reduce the amount of the sewage penetrating between the second barrier portion 31 and the cover plate 2.

The second barrier portion 31 may comprises a barrier mesh and a material having absorption ability. In a specific embodiment, the second barrier portion 31 comprises a second barrier rib 311, the second barrier rib 311 is in the shape of a sheet, and the second barrier rib 311 extends downwards from the bottom surface of the tank cover 3. A horizontal distance-between a surface of the second barrier rib 311 and the edge of the cover plate is greater than or equal to 0.5 mm, and smaller than or equal to 5 mm.

The second barrier portion and the tank cover 3 can be formed as a whole, or can be in fixed connection by a fastener. The arrangement of the second barrier rib 311 is able to enhance the integral intensity of the tank cover 3.

During the practical use, a part of the sewage may be still possible to transcend over the cover plate 2 through a gap between the second barrier portion 31 and the edge of the cover plate 2, and move along a lower surface of the tank cover 3 towards the suction port 11. Therefore, referring to FIGS. 2-4, in an embodiment, the bottom surface of the tank cover 3 is further provided with a third barrier portion 32; and the third barrier portion 32 is arranged within the gap between the tank cover 3 and the cover plate 2 and configured for blocking the sewage having entered the gap between the tank cover 3 and the cover plate 2.

A part of the sewage may transcend over the cover plate 2 from the gap between the second barrier portion 31 and the cover plate, and most of this part of sewage tends to agglomerate at the lower surface of the tank cover and to move along the lower surface of the tank cover 3 towards the suction port 11. During this moving process, the sewage is stopped by the third barrier portion 32, agglomerated at the third barrier portion 32 or slidable along the third barrier portion 32, and finally moves along the third barrier portion 32 and drips down into the tank body 1.

The third barrier portion 32 may comprises a barrier mesh and a material having absorption ability. In an embodiment, the third barrier portion 32 comprises a third barrier rib 321, the third barrier rib 321 is in the shape of a plate. At least one end of the third barrier rib 321 extends over the edge of the cover plate 2 in order to guide the sewage to fall downwards to a bottom of the tank body 1. The plate-like third barrier portion 32 has relatively large surface area, which is able to block and adhere the sewage. The sewage accumulated at the surface of the third barrier portion 32 can form large liquid droplets, which in turn slide along the surface of the third barrier portion 32 and finally drip into the tank body.

The third barrier portion and the tank cover 3 can be formed as a whole, or can be in fixed connection by a fastener. The arrangement of the third barrier rib 321 is able to enhance the integral intensity of the tank cover 3.

Furthermore, the solid dirt or sewage blocked by the third barrier portion 32 may fall down to the upper surface of the cover plate 2, and in turn move within the gap between the third barrier portion 32 and the cover plate 2 towards the suction port 11, which increases the risk of blocking the suction port 11. Based on this, referring to FIG. 4, in an embodiment, a top surface of the cover plate 2 is further provided with a fourth barrier portion 22. The fourth barrier portion 22 is arranged within the gap between the tank cover 3 and the cover plate 2. The fourth barrier portion 22 is arranged at a side of the third barrier portion 32 adjacent to the suction port 11, so as to prevent the sewage having fallen from the third barrier portion 32 to the cover plate 2 from moving towards the suction port 11.

In this embodiment, the sewage moving along the third barrier portion 32 drips onto the cover plate 2, and moves towards the suction port under the negative pressure, during which, the sewage is blocked by the fourth barrier portion, and therefore agglomerated at the fourth barrier portion 22 to form a liquid flow. The liquid flow slides along the fourth barrier portion 22 and downward to the tank body 1, in this way, the sewage is prevented from entering the suction port 11.

The fourth barrier portion 22 may comprises a barrier mesh and a material having absorption ability. In an embodiment, the fourth barrier portion 22 comprises a fourth barrier rib 221. The fourth barrier rib 221 is in the shape of a plate; and the fourth barrier rib 221 is convex from the top surface of the cover plate 2. A height of the fourth barrier rib 221 is required to be constructed according to a height of the gap between the cover plate 2 and the tank cover 3.

The fourth barrier portion and the cover plate 2 can be formed as a whole, or can be in fixed connection by a fastener. The arrangement of the fourth barrier rib 221 is able to enhance the integral intensity of the cover plate 2.

Figure 8:
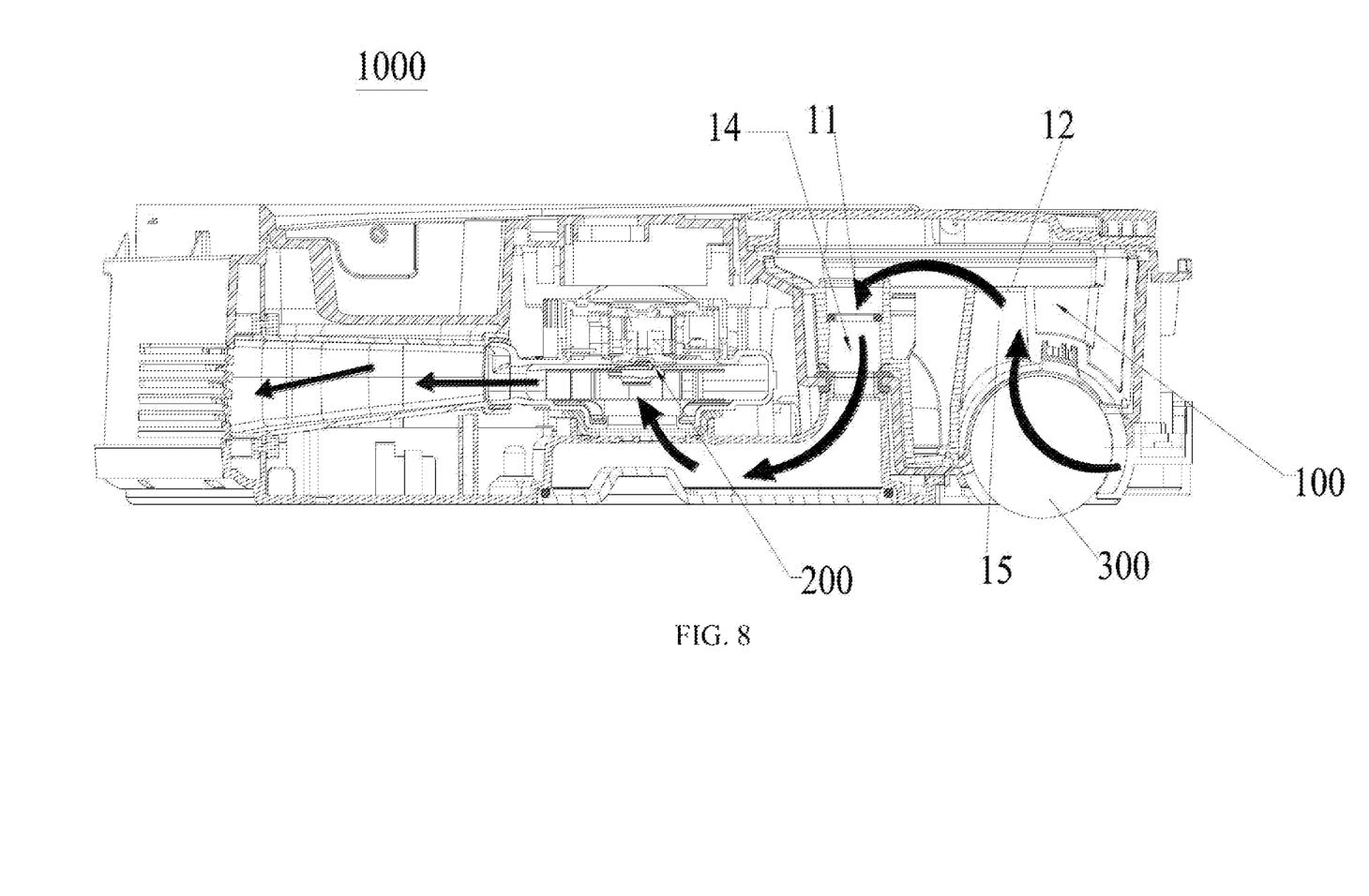
FIG. 8 is a cross sectional view of a cleaning robot according to an embodiment of the present application.

Embodiments of the present application further provide a cleaning robot 1000. As shown in FIG. 8, the cleaning robot 1000 comprises a sewage storage tank 100, a cleaning roller 300, and a suction fan 200. The suction fan 200 is mounted at a position corresponding to the suction port 11 of the sewage storage tank 100. The cleaning roller 300 is mounted beneath the sewage storage tank 100 and close to the intake port 12. The specific structure and beneficial effects of the sewage storage tank are the same as those as described in the above embodiments, and therefore will not be repeated herein again.

While the application has been described with reference to various exemplary embodiments, it is to be understood that the adopted terminology is for the purpose of description and illustration, rather than limitation. Since the application can be implemented in many forms without departing from the spirit or essence of the invention, it is to be understood that the above-described embodiments are not limited to any of the foregoing details, but are to be construed broadly within the spirit and scope defined by the appended claims. Therefore, all changes and modifications that come within the scope of the claims or their equivalents should be covered by the appended claims.

What is claimed is:

1. A sewage storage tank, comprising:
a tank body, defining therein a suction port and an intake port, wherein the suction port is configured to communicate with a suction fan arranged outside the sewage storage tank, to enable the suction fan to suction air from the tank body via the suction port and to generate a negative pressure at the intake port, such that sewage outside the tank body is suctioned into the tank body via the intake port under the negative pressure;
a barrier structure, which comprises a first barrier portion and is arranged inside the tank body and located in a flow path between the intake port and the suction port, so as to block the sewage having entered the intake port from moving towards the suction port; and a cover plate, which integrally presents a flat plate structure and is laterally mounted in the tank body and located above the suction port and the intake port;
wherein
the first barrier portion is arranged at a bottom surface of the cover plate and extends in a direction away from the cover plate so as to block the sewage having entered the intake port from moving towards the suction port; and
the cover plate is configured to move between a sealed position, where the cover plate simultaneously seals both the suction port and the intake port, and an unsealed position, where the cover plate simultaneously unseals both the suction port and the intake port.

2. The sewage storage tank according to claim 1, wherein the first barrier portion comprises a first barrier rib, and a height of a bottom edge of the first barrier rib is equivalent to a height of the intake port.

3. The sewage storage tank according to claim 1, further comprising a tank cover;
wherein
the tank cover is configured to cover the tank body to form an enclosed accommodation chamber with the tank body and to allow the cover plate to be placed inside the accommodation chamber.

4. The sewage storage tank according to claim 3, a bottom surface of the tank cover is protrudingly provided with a second barrier portion, and the second barrier portion is arranged to block the sewage having entered the intake port from flowing above the cover plate.

5. The sewage storage tank according to claim 4, wherein
the second barrier portion comprises a second barrier rib, and the second barrier rib extends downwards from the bottom surface of the tank cover; and
a horizontal distance-between a surface of the second barrier rib and the edge of the cover plate is greater than or equal to 0.5 mm, and smaller than or equal to 5 mm.

6. The sewage storage tank according to claim 3, wherein
a gap is arranged between the tank cover and the cover plate;
the bottom surface of the tank cover is further provided with a third barrier portion; and
the third barrier portion is arranged within the gap and configured for blocking the sewage having entered the gap.

7. The sewage storage tank according to claim 6, wherein
the third barrier portion comprises a third barrier rib, the third barrier rib extends from the bottom surface of the tank cover downwards, and at least one end of the third barrier rib extends over the edge of the cover plate in order to guide the sewage to fall downwards to a bottom of the tank body.

8. The sewage storage tank according to claim 6, wherein
a top surface of the cover plate is further provided with a fourth barrier portion;
the fourth barrier portion is arranged within the gap; and
the fourth barrier portion is arranged at a side of the third barrier portion adjacent to the suction port, so as to prevent the sewage having fallen from the third barrier portion to the cover plate from moving towards the suction port.

9. The sewage storage tank according to claim 8, wherein
the fourth barrier portion comprises a fourth barrier rib; and the fourth barrier rib is protrudingly provided on the top surface of the cover plate.

10. The sewage storage tank according to claim 1, wherein
a boss is arranged within the sewage storage tank, and the boss is convex from a bottom wall of the tank body.

11. The sewage storage tank according to claim 10, further comprising a driver; wherein the driver is mounted inside the tank body and configured to drive the cover plate to move from the sealed position to the unsealed position.

12. The sewage storage tank according to claim 1, wherein the cover plate is in rotational connection with the tank body.

13. A cleaning robot, comprising:
a sewage storage tank, comprising:
a tank body, defining therein a suction port and an intake port, wherein the suction port is configured to communicate with a suction fan arranged outside the sewage storage tank, to enable the suction fan to suction air from the tank body via the suction port and to generate a negative pressure at the intake port, such that sewage outside the tank body is suctioned into the tank body via the intake port under the negative pressure; and
a barrier, which comprises a first barrier portion and is arranged inside the tank body and located in a flow path between the intake port and the suction port, so as to block the sewage having entered the intake port from moving towards the suction port; and
a cover plate, which integrally presents a flat plate structure and is laterally mounted in the tank body and located above the suction port and the intake port;
a cleaning roller; and
the suction fan;
wherein
the first barrier portion is arranged at a bottom surface of the cover plate and extends in a direction away from the cover plate so as to block the sewage having entered the intake port from moving towards the suction port;
the suction fan is mounted at a position corresponding to the suction port of the sewage storage tank;
the cleaning roller is mounted beneath the sewage storage tank and close to the intake port; and
the cover plate is configured to move between a sealed position, where the cover plate simultaneously seals both the suction port and the intake port, and an unsealed position, where the cover plate simultaneously unseals both the suction port and the intake port.

14. The cleaning robot according to claim 13, wherein the first barrier portion comprises a first barrier rib, and a height of a bottom edge of the first barrier rib is equivalent to a height of the intake port.

15. The cleaning robot according to claim 13, wherein
the sewage storage tank further comprises a tank cover;
the tank cover is configured to cover the tank body to form an enclosed accommodation chamber with the tank body and to allow the cover plate to be placed inside the accommodation chamber.

16. The cleaning robot according to claim 15, wherein a bottom surface of the tank cover is protrudingly provided with a second barrier portion, and the second barrier portion is arranged to block the sewage having entered the intake port from flowing above the cover plate.

17. The cleaning robot according to claim 16, wherein
the second barrier portion comprises a second barrier rib, and the second barrier rib extends downwards from the bottom surface of the tank cover; and
a horizontal distance-between a surface of the second barrier rib and the edge of the cover plate is greater than or equal to 0.5 mm, and smaller than or equal to 5 mm.

18. The cleaning robot according to claim 15, wherein
a gap is arranged between the tank cover and the cover plate;
the bottom surface of the tank cover is further provided with a third barrier portion; and
the third barrier portion is arranged within the gap and configured for blocking the sewage having entered the gap.

19. The cleaning robot according to claim 18, wherein
the third barrier portion comprises a third barrier rib, the third barrier rib extends from the bottom surface of the tank cover downwards, at least one end of the third barrier rib extends over the edge of the cover plate in order to guide the sewage to fall downwards to a bottom of the tank body.

20. The cleaning robot according to claim 13, wherein the cover plate is in rotational connection with the tank body.

* * * * *